Patented Jan. 7, 1930

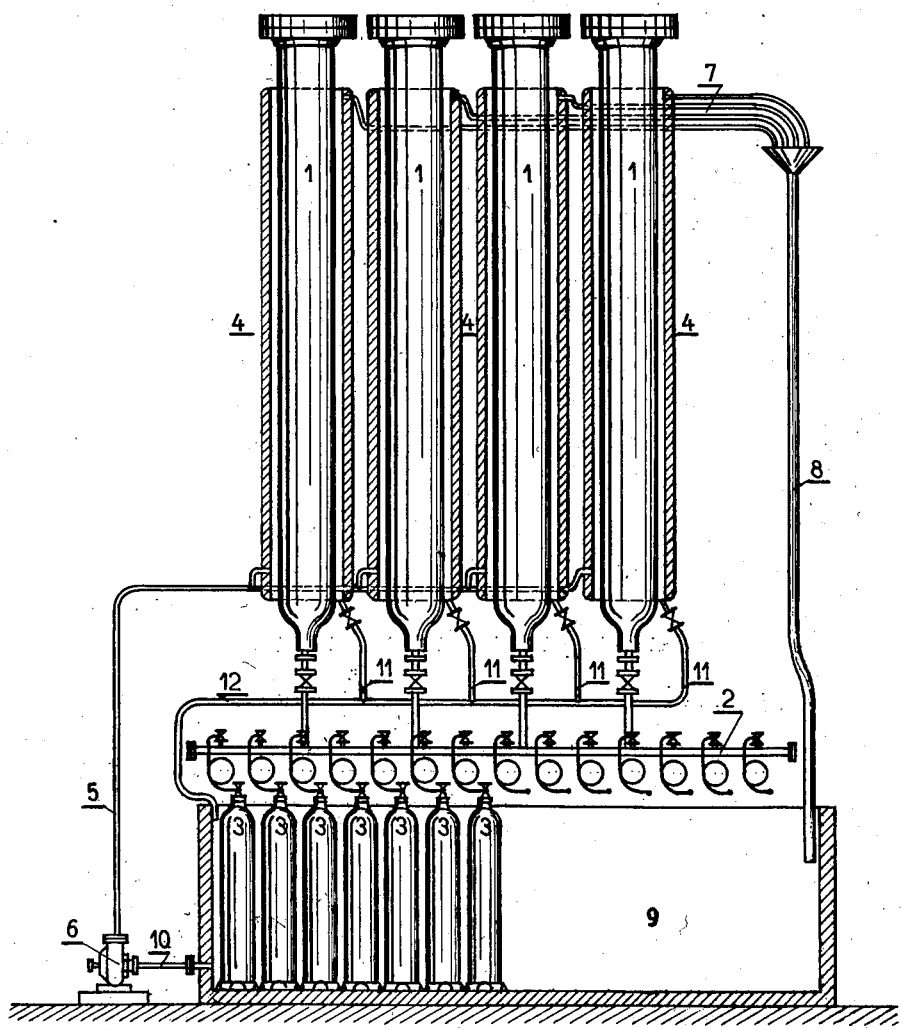

1,742,975

UNITED STATES PATENT OFFICE

JOSEF STOFFELS, OF ESSLINGEN, GERMANY, ASSIGNOR TO MASCHINENFABRIK ESSLINGEN, OF ESSLINGEN, GERMANY

PROCESS AND APPARATUS FOR MELTING SOLID CARBON DIOXIDE

Application filed March 29, 1929, Serial No. 351,024, and in Germany April 7, 1928.

It has been proposed to ship carbon dioxide in solid condition to great distances and to melt it from the shipping drums and run it off into steel vessels for further use only when it has reached its destination. For this purpose the solid carbon dioxide must be brought to the melting point by heating.

The object of this invention is to provide a process and an apparatus in which the quantities of cold extracted from the solid carbon dioxide during the melting process are utilized to cool the receiving vessels into which the carbon dioxide is run as it is melted. It is absolutely essential to cool the receiving vessels for the melted carbon dioxide when the surrounding temperature is high, for example, in tropical countries, for otherwise it is impossible to run the liquid carbon dioxide into them. The utilization of the cold extracted from the melting drums containing the solid carbon dioxide, in accordance with this invention, makes the procedure commercially practicable for the first time. If a circulating liquid is used as the cold carrier, according to the invention, the procedure is greatly accelerated, for the absorption of cold from the melting drums proceeds much more rapidly in this manner than with air absorption.

The drawing shows diagrammatically one form of apparatus arranged in accordance with the invention. The solid carbon dioxide is brought to the melting point in cylindrical high pressure drums 1, from which it is led in liquid condition through the tubes 2 to the receiving vessels (steel drums) 3, the high pressure drums being mounted for this purpose above the receiving vessels. The drums 1 are surrounded, with clearance, by cylindrical jackets 4 into which a liquid that is non-freezing at the temperatures involved, for example, brine or alcohol, is led through the tubing 5. The non-freezing liquid is pumped up into the jackets 4 by the pump 6, so that it flows along the walls of the melting drums, and runs through the tubes 7 from the jackets to a common conduit 8 by which it is led into the tank 9 in which the receiving vessels 3 are mounted. The non-freezing liquid is sucked out of the tank 9 by the pump 6 through the conduit 10 and begins again the same cycle.

For emptying the jackets 4, tubes 11 are connected to the lower ends of the jackets, which convey the contents of the latter through a common conduit 12 into the tank 9.

The receiving vessels are gradually brought, by the circulating non-freezing liquid, to the same temperature as the melting drums. The procedure is regulated in such a manner that the receiving vessels are filled with liquid carbon dioxide when this equal temperature is reached.

Having described my invention,
What I claim is:

1. Process for melting solid carbon dioxide which consists in extracting sufficient cold from the carbon dioxide to melt the same, and running the resulting liquid into containers, while maintaining the latter cool by means of the cold extracted from the solid carbon dioxide.

2. Process according to claim 1 in which the exchange of cold from the solid carbon dioxide to the containers is accomplished by circulating a suitable liquid around the former and then the latter in alternation.

3. Apparatus for melting solid carbon dioxide contained in a high pressure drum comprising a receiving vessel, means for conveying melted carbon dioxide from the high pressure drum to the receiving vessel, means for maintaining a non-freezing liquid in contact with said drum and said vessel, and means for circulating the non-freezing liquid so that it comes alternately in contact with said drum and said vessel.

The foregoing specification signed at Stuttgart, Germany, this 15th day of March, 1929.

JOSEF STOFFELS.